United States Patent Office 3,789,035
Patented Jan. 29, 1974

3,789,035
PROCESS FOR PRODUCING METAL-CONTAINING ETHYLENIC COPOLYMER
Isamu Iwami, Tokyo, Hironobu Kawasaki, Yokohama, and Hideo Kinoshita, Kawasaki, Japan, assignors to Asahi-Dow Limited, Tokyo, Japan
Filed Oct. 10, 1972, Ser. No. 295,875
Claims priority, application Japan, Oct. 11, 1971, 46/79,503; Dec. 21, 1971, 46/103,217
Int. Cl. C08f 27/04
U.S. Cl. 260—78.5 T      23 Claims

ABSTRACT OF THE DISCLOSURE

A process for producing a metal-containing ethylenic copolymer having a degree of saponification of 30 to 100 mole percent and a degree of neutralization of 60 to 100 mole percent which comprises saponifying a primary copolymer of ethylene and at least one ester of $\alpha,\beta$-ethylenically unsaturated carboxylic acid having 4 to 10 carbon atoms, the unsaturated carboxylic ester content of said primary copolymer being 1 to 20 mole percent, with a basic metal compound in a solvent. A metal-containing copolymer having any desired degree of neutralization can be obtained from the aforesaid metal-containing ethylenic copolymer by contacting with an inorganic and/or organic acid to convert a part of the metal carboxylate groups in the copolymer into carboxyl groups. Alternatively, such a metal-containing ethylenic copolymer having any desired degree of neutralization can also be produced by melt-mixing those copolymers which have different degrees of neutralization. Further, any desired metal can be introduced into the alkali metal-containing copolymer by dispersing the copolymer in water and/or alcohol and adding thereto a compound having the desired non-alkali metal to effect ion-exchange.

---

Figure 1:
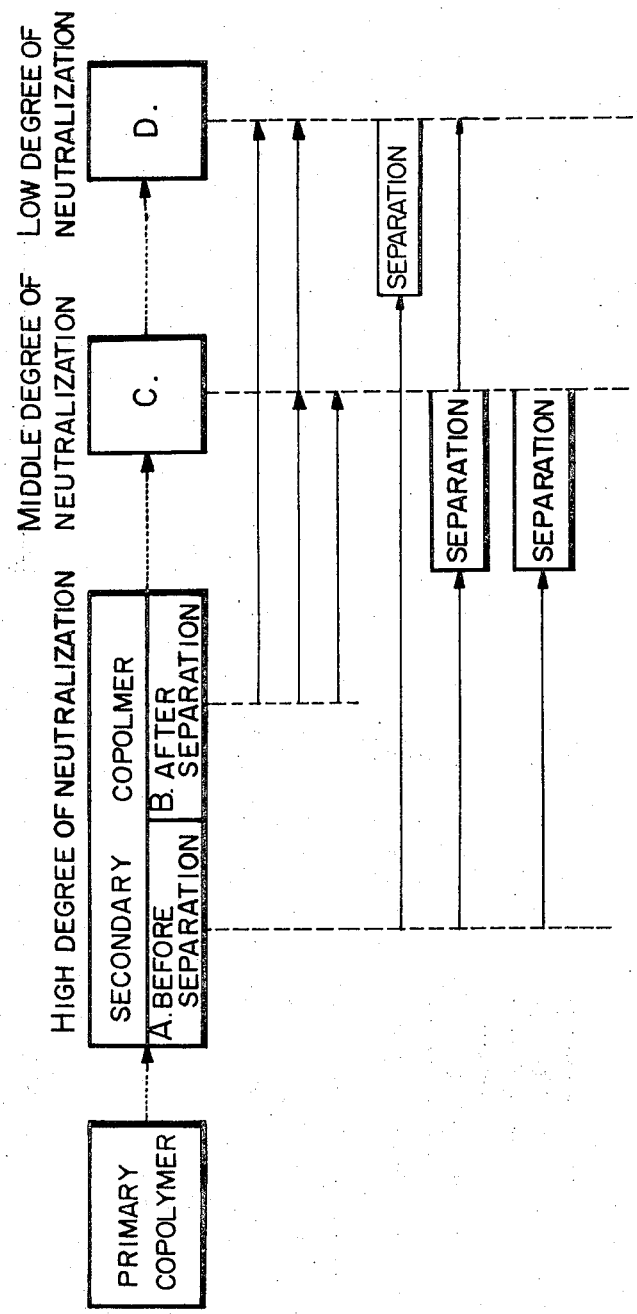

This invention relates to a process for producing an ethylenic metal-containing copolymer. More particularly, this invention relates to a process for producing an ethylenic copolymer composed of monomeric units of ethylene, an $\alpha,\beta$-ethylenically unsaturated carboxylic acid, a metal salt of an $\alpha,\beta$-ethylenically unsaturated carboxylic acid, and, if necessary, an $\alpha,\beta$-ethylenically unsaturated carboxylic ester which comprises saponifying a copolymer of ethylene and $\alpha,\beta$-ethylenically unsaturated carboxylic ester, and, if necessary, removing the metal from the resulting metal salt, and, if necessary, further exchanging the metal ion with another metal ion.

The ethylenic copolymer containing a metal has conventionally been known in the art (see U.S. Pat. No. 3,264,272). This copolymer has been prepared from a base copolymer, which is an ethylene-carboxylic acid copolymer obtained by direct copolymerization of ethylene and an unsaturated carboxylic acid, by neutralizing 10 to 90% of the carboxyl groups contained in said base copolymer with metal ions.

The conventional process for producing the copolymer containing metal ions involves various problems. Firstly, there is a problem concerning construction materials for the equipments, which arises from the use of an acid monomer in preparing the base copolymer. An ethylene-carboxylic acid copolymer used as the base copolymer in the conventional process has been obtained chiefly by direct copolymerization of ethylene and an acid monomer. Since the acid monomer is corrosive to metals, the said copolymerization cannot be carried out in customary production equipments for high-pressure polyethylene. In order to carry out the copolymerization by use of such equipments, a polymerization apparatus made of acid-resistant materials is required, resulting in an increased equipment cost. To avoid the use of an acid monomer, there has been proposed a process whereby ethylene and an unsaturated carboxylic acid derivative are copolymerized and the resulting copolymer is hydrolyzed, saponified or thermally decomposed to obtain the ethylene-carboxylic acid copolymer. In particular, pyrolysis is disclosed in U.S. Pat. No. 3,132,120. In any way, however, these processes are a two-stage process for producing an ethylene-carboxylic acid copolymer, and hence are of little economical merit if practiced commercially.

The second problem is a complexity in equipments and operation for allowing ionizable metal compounds to act on the aforesaid base copolymer. In the conventional process, neutralization of the base copolymer is effected by addition of a metal compound. In this case, it is required to distribute the metal compound uniformly throughout the high molecular base copolymer, and to vaporize the reaction product of the anion radical in the metal compound with the hydrogen in the carboxyl group. Since these requirements were difficult to meet in a conventional manner, a high-temperature melt-mixing technique has been adopted. However, the application of this technique on an industrial scale demands tremendous efforts in view of equipment (including construction materials) and operation.

The first object of this invention is to provide an industrial process for producing metal-containing copolymers at low cost.

The second object of this invention is to provide a method for accurately and easily controlling the metal content (degree of neutralization) of the metal-containing copolymer according to the purpose of use thereof.

A further object of this invention is to provide a method for introducing a metal species selected in accordance with the intended use of the metal-containing copolymer into the copolymer.

These objects have been achieved, as a result of various investigations, with the establishment of the process herein disclosed.

This invention provides a process which comprises reacting a copolymer of ethylene and an $\alpha,\beta$-ethylenically unsaturated carboxylic ester (hereinafter referred to as primary copolymer) with a basic metal compound (so-called saponification reaction) to convert the carboxylic ester groups of said copolymer into metal carboxylate groups and carboxyl groups, thereby producing a metal-containing copolymer (hereinafter referred to as secondary copolymer) having a high degree of neutralization. This invention provides also a method for controlling the degree of neutralization in accordance with the use of the product, which comprises reacting the secondary copolymer with an acid to demetallizing a part of the metal carboxylate groups into carboxyl groups, or alternatively blending the secondary copolymer with a metal-containing copolymer having a lower degree of neutralization to obtain the intended degree of neutralization. This invention further provides a method for exchanging the alkali metal ions introduced into the secondary copolymer with the desired non-alkali metal ions by taking advantage of difference in affinity of the carboxyl anion for different metal species.

The features of this invention are as follows: First, the secondary copolymer having a high degree of neutralization and a desired degree of saponification may be obtained in a single operation step by saponifying the primary copolymer which can be prepared by using an ordinary equipment for high-pressure polyethylene. The second is that when required according to the product design, the adjustment of the degree of neutralization can be carried out by using an acid or a polymer-blending technique more advantageously in view of operation as well as economy, as compared with the conventional neutralization method which is carried out at an elevated temperature while removing the by-product. Thirdly, it is also a prominent feature of this invention that an ion-exchanging reaction can be utilized for introducing the desired metal.

The adjustment of the degree of neutralization and the metal ion-exchanging reaction, both of which are characteristic features of this invention, are further explained below, referring to the accompanying drawings, in which FIG. 1 schematically illustrates the relationship between the steps required for this invention.

The adjustment of the degree of neutralization may be carried out to the desired degree in a single step immediately after saponification or after separation of the secondary copolymer, or may be in two steps in which according to the use of the end product and to the object of the operation, the degree of neutralization is first adjusted to a middle degree of neutralization and a part or the whole of the thus adjusted copolymer is further adjusted to a lower degree of neutralization.

On the other hand, the metal ion exchange can be carried out in combination with the aforesaid adjustment of the degree of neutralization in each of the stages A, B, C and D. Thus, a metal-containing copolymer having a desired metal species and a desired degree of neutralization may easily be prepared.

In FIG. 1, the solid lines indicate stages of adjusting the degree of neutralization, and the broken lines indicate where the metal ion exchange may be carried out.

In this invention, the three elementary reactions, i.e., saponification, adjustment of the degree of neutralization, and ion exchange, are in a trinity relationship, so that a variety of combinations are possible to make the best use of each reaction. Therefore, the commercial value of this invention is very great.

Before going into a detailed explanation of each element of this invention in order, a general formula representing the composition of various copolymers is given below for the sake of explanation.

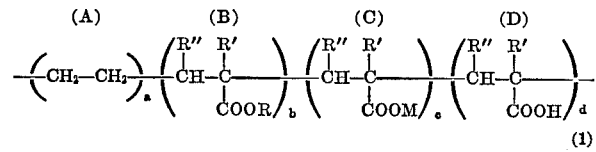

(1)

where, (A) is monomeric ethylene unit,
(B) is monomeric unit derived from a monoester of an unsaturated monocarboxylic acid or a diester of an unsaturated dicarboxylic acid, having preferably 4 to 10 carbon atoms,
(C) is monomeric unit derived from a mono- or di-metal salt of an unsaturated mono- or dicarboxylic acid having preferably 3 to 9 carbon atoms, and
(D) is monomeric unit derived from an unsaturated mono- or di-carboxylic acid having preferably 3 to 9 carbon atoms.

In the above formula, R is a lower alkyl group such as methyl, ethyl, or the like, M is a metal, and R' and R'' are hydrogen or lower alkyl groups such as methyl, ethyl or the like. Further, either R' or R'' in unit (B) may be —COOR and either R' or R'' in units (C) and (D) may be —COOR, —COOM or —COOH. Small letters $a$, $b$, $c$ and $d$ represent the numbers of moles of the respective monomeric units in the copolymers. Units (A), (B), (C) and (D) may be connected at random or in the block or graft form.

(I) Primary copolymer

The primary copolymer to be used in practising this invention is a copolymer of ethylene and an $\alpha,\beta$-ethylenically unsaturated monocarboxylic ester or an $\alpha,\beta$-ethylenically unsaturated dicarboxylic diester. The unsaturated carboxylic ester content of said copolymer is from 1 to 20 mole percent, more preferably from 3 to 10 mole percent.

The composition of the said copolymer can be expressed in the following manner referring to the Formula 1:

$$\frac{b_p}{a_p+b_p} \times 100 = 1 \text{ to } 20 \text{ (preferably 3 to 10)}$$

$$(c_p = 0; \ d_p = 0)$$

where, $p$ is a suffix standing for primary copolymer.

The monomeric ester for use in this case is an ester of an $\alpha,\beta$-ethylenically unsaturated carboxylic acid having 4 to 10 carbon atoms. Examples of such monomers are methyl acrylate, ethyl acrylate, methyl methacrylate, n-butyl methacrylate, dimethyl fumarate, diethyl itaconate, dimethyl maleate, etc. These ester monomers may be used alone or in combination of two or more. In some cases, a vinyl ester such as vinyl acetate is used in combination with the above-said ester monomers in copolymerization. The preparation of the primary copolymer is preferably carried out by copolymerizing ethylene with an ester monomer at high temperatures and pressures according to a well-known technique for high-pressure polyethylene production. In addtion, the copolymerization is sometimes carried out by an emulsion process. The primary copolymers thus obtained are, for example, ethylene/methyl acrylate copolymer, ethylene/ethyl acrylate copolymer, ethylene/methyl methacrylate copolymer, ethylene/methyl acrylate/methyl methacrylate copolymer, ethylene/diethyl itaconate copolymer, and ethylene/methyl acrylate/dimethyl itaconate copolymer. The melt index (ASTM D-1238-62 P) of the primary copolymer ranges preferably from 1 to 500. The form of the primary copolymer can be either powder or granules. In some instances, a shaped article can be used without causing any trouble.

(II) Secondary copolymer

To obtain the second copolymer according to this invention, it is necessary to saponify the primary copolymer. The saponification is effected fundamentally by heating the primary copolymer, a basic metal compound and a solvent containing an alcohol to react them.

As the criterion for the saponification reaction, there is used the degree of saponification. The term "degree of saponification" as used herein means the degree of conversion of the carboxylic ester groups in the primary copolymer into metal carboxylate groups and carboxyl groups and may be expressed in the following manner in terms of the notations used in the Formula 1:

Degree of saponification (mole percent)

$$= \frac{c_s + d_s}{b_s + c_s + d_s} \times 100$$

where $s$ is a suffix standing for secondary copolymer.

Control of the degree of saponification has a great significance because, in general, the degree of saponification (in other words, the amount of the residual carboxylic ester groups) greatly affects not only the secondary copolymer but also the metal-containing copolymer, the degree of neutralization of which had been adjusted, in important physical properties for end products, such as, for example, melt viscosity, processability, mechanical properties (elongation, etc.), and affinity for other substrate materials. In the process of this invention, a secondary copolymer having a desired degree of saponification can optionally be obtained by controlling the amount of basic metal compound, temperature and time.

The basic metal compounds to be used in saponification reaction include chiefly hydroxides of alkali metals, such as sodium hydroxide and potassium hydroxide; sodium methoxide, sodium ethoxide, and the like.

These basic alkali metal compounds can be used along with salts, oxides and hydroxides of the same metal or other metals. The said other metals are suitably metals of Groups I-B, II-A, II-B and III-A and metals of the fourth period of Group VIII of the Periodic Table of the Elements (see John H. Perry, Chemical Engineers' Hand Book, 4th ed., "Periodic Table of the Elements" McGraw-Hill, Kôgakusha).

The amount of these basic metal compounds to be used is 1 to 5 times the theoretical molar amount required for the reaction, depending on the desired degree of saponification.

The solvents for use in the saponification reaction are organic solvents including aliphatic alcohols such as methanol, ethanol, n-propyl, isopropanol, n-butanol, isobutanol, sec-butanol, pentanols, etc.; aromatic hydrocarbons such as benzene, toluene, xylenes, etc.; aliphatic hydrocarbons such as n-hexane, n-heptane, etc.; hydroaromatic hydrocarbons such as cyclohexane, etc.; halogen-substituted aliphatic hydrocarbons such as dichloroethane, trichloroethylene, etc.; and halogenated aromatic compounds such as chlorobenzene, etc. In some cases, water is used along with the said solvent systems.

These solvents may be used in various combinations. For example, there are combinations such as isopropanol alone, methanol/benzene, methanol/n-heptane, isopropanol/xylene, isobutanol/xylene, heptane/methanol/water and the like. Beside the said combinations, ketones such as acetone, methyl ethyl ketone, etc., amines, amides, ethers, hydroxyethers and the like can be additionally used as reaction promoter.

The temperature for the saponification reaction is 60 to 180° C., more preferably 80 to 120° C., depending upon the type of the reaction. The period of time for the saponification reaction is ordinarily 10 to 500 minutes.

There are various types of saponification reaction which may be broadly classified into a homogeneous system and a heterogeneous system. The homogeneous system refers to a reaction type where the copolymer remains uniformly dissolved in the solvent during the reaction. In this case, the solvent chiefly used is a combination of an aliphatic alcohol with at least one compound selected from the group consisting of aromatic hydrocarbons, hydroaromatic hydrocarbons, aliphatic hydrocarbons, halogen-substituted aliphatic hydrocarbons and halogenated aromatic compounds. The reaction product obtained from the homogeneous system is in the form of a powder. In contrast to this, the heterogeneous system refers to a reaction type where shaped articles of the primary copolymer, such as pellet, film, bottle, etc., are subjected to saponification without losing their initial shape. In this case, it is necessary to carefully select the solvent for use and the reaction temperature. The solvents chiefly used are aliphatic alcohols such as methanol, ethanol, propanols, butanols, etc. In some cases, the aliphaitc alcohol is used along with small amounts of at least one compound selected from the group consisting of aromatic hydrocarbons, hydroaromatic hydrocarbons, aliphatic hydrocarbons, halogen-substituted aliphatic hydrocarbons, and halogenated aromatic compounds. Particularly in the case of the heterogeneous system, it is effective for acceleration of the reaction rate of heterogeneous saponification that pellets or other shaped articles of the primary copolymer are preliminary impregnated with at least one compound selected from the group consisting of aromatic hydrocarbons, hydroaromatic hydrocarbons, aliphatic hydrocarbons, halogen-substituted aliphatic hydrocarbons, and halogenated aromatic compounds; and the joint use of reaction-promoting solvents such as amines, ethers, etc., is still more effective.

The extent of saponification in this invention ranges from 30 to 100 mole percent, preferably from 70 to 100 mole percent, in terms of degree of saponification. The degree of neutralization of the saponified product (secondary copolymer) is generally 60 to 100 mole percent, depending upon the way of washing. The degree of neutralization referred to herein may be generally expressed in terms of notations used in the Formula 1 as follows:

$$\text{Degree of neutralization (mole percent)} = \frac{c}{c+d} \times 100$$

Though the composition of the secondary copolymer is apparent from the foregoing explanation, it may further be expressed in the following manner in terms of notations used inthe Formula 1:

$$\frac{b_s + c_s + d_s}{a_s + b_s + c_s + d_s} \times 100 = 1 \text{ to } 20 \text{ (preferably 3 to 10)}$$

$$\frac{c_s + d_s}{b_s + c_s + d_s} \times 100 = 30 \text{ to } 100 \text{ (preferably 70 to 100)}$$
(degree of saponification, mole percent)

$$\frac{c_s}{c_s + d_s} \times 100 = 60 \text{ to } 100 \text{ (degree of neutralization, mole percent)}$$

where $s$ is a suffix standing for secondary copolymer.

(III) Adjustment of degree of neutralization

The physical properties of the ethylenic copolymer containing metals are generally related closely to the molecular weight and the carboxylic acid content of the copolymer and are greatly affected by the degree of neutralization among others. The physical properties which are related to the degree of neutralization include transparency, tensile strength at break, abrasion resistance, and stiffness. The melt viscosity, which is closely related to processability is also affected considerably by the degree of neutralization. Therefore, the product design of the metal-containing ethylenic copolymer is feasible only when a method for precisely determining the degree of neutralization has been established.

Grading the metal-containing ethylenic copolymers according to the degree of neutralization, the uses for each grade are as follows:

(1) Copolymers having a high degree of neutralization (60 to 100 mole percent): These copolymers are such as the aforementioned secondary copolymers and are utilized for uses where emphasis is placed on such physical properties as abrasion resistance and oil resistance, and for uses where advantage is taken of the melt characteristics.

(2) Copolymers of middle degree of neutralization (10 to 60 mole percent): These are the most common of the metal-containing copolymers, which are characterized by being well-balanced between such physical properties as transparency and tensile strength at break and processability.

(3) Copolymers of a low degree of neutralization (1 to 10 mole percent): These copolymers are used in laminates taking advantage of adhesion.

The methods for adjusting the degree of neutralization to a middle degree or a low degree include a chemical method whereby the secondary copolymer as well as the metal-containing copolymer derived therefrom are treated with an acid, and a physical methd of polymer-blending. An explanation of these methods is given below.

(III-1) Adjustment of degree of neutralization by acid treatment

Within this invention is the adusjmtent of the degree of neutralization by acid treatment, which is a method of demetallizing the secondary copolymer or the metal-containing copolymer derived therefrom by treating it with an acid. The term "demetallizing" as used herein means a process whereby the secondary copolymer or the metal-containing copolymer derived therefrom is reacted with an acid to convert a part of the metal carboxylate groups in the metal-containing copolymer into carboxyl groups. Derivatives of the secondary copolymer include those metal-containing copolymers which are obtained from the secondary copolymer by adjusting the degree of neutralization or by exchanging the metal ion. The demetallizing reaction in this case is easily carried out by dispersing said metal-containing copolymer in a solvent containing water and/or an alcohol as the major component, and stirring the resulting dispersion after addition of an organic acid and/or an inorganic acid.

The acids for use in the demetallization reaction include organic acids such as formic acid, acetic acid, butyric acid, etc.; and inorganic acids such as hydrochloric acid, sulfuric acid, phosphoric acid, nitric acid, etc. The solvents to be used in the demetallization reaction are chiefly water and/or alcohols such as methanol, ethanol, isopropanol, and the like. In some cases, in order to facilitate the reaction a powder, pellets or a shaped article of the metal-containing copolymer is impregnated with such solvents as aromatic hydrocarbons, hydroaromatic hydrocarbons, or aliphatic hydrocarbons; or these solvents may be added as a swelling agent to the above-mentioned solvent systems. The reaction temperature for the de-metallization is 0° to 100° C., and the reaction time is 10 to 200 minutes. The control of the extent of saponification, namely, the adjustment of the degree of neutralization, can be achieved by changing the amount of acid in the reaction system, the reaction temperature and the reaction time. The addition of an acid can be controlled also by adjusting the ultimate pH of the reaction system to a predetermined value. This is one of the characteristic features of this invention. The degree of neutralization of the metal-containing copolymer according to this invention is 1 to 100 mole percent. Any degree of neutralization within this range can be easily attained by using the secondary copolymer and the acid treatment.

The adjustment of the degree of neutralization of acid treatment is applied generally to the secondary copolymer after saponification, from which the solvent has been removed. Alternatively, on completing the saponification of the primary copolymer, the reaction mixture may directly be treated with an acid regardless of homogeneous or heterogeneous system and the metal-containing copolymer may then be isolated.

(III-2) Adjustment of degree of neutralization by polymer-blending

The adjustment of the degree of neutralization by polymer-blending within this invention is characterized by a very easy and precise adjustment of the degree of neutralization. The adjustment of the degree of neutralization by polymer-blending is for producing a metal-containing copolymer having a desired degree of neutralization, namely a corresponding amount of metal, by melt-blending the secondary copolymer, for the purpose of reducing the degree of neutralization, with a stoichiometric amount of a copolymer (1) which has a composition represented by the Formula 1 and satisfying the following conditions:

$$\frac{b+c+d}{a+b+c+d} \times 100 = 1 \text{ to } 20 \text{ (preferably 3 to 10)}$$

$$\frac{c+d}{b+c+d} \times 100 = 30 \text{ to } 100 \text{ (preferably 70 to 100)}$$

Degree of neutralization $= \frac{c}{c+d} \times 100 = 0$ to 20

As the copolymer (1), there may be used a copolymer (having a degree of neutralization of 0 to 20 mole percent) obtained by treating the secondary copolymer with an acid; and a copolymer of ethylene and an α,β-ethylenically unsaturated mono- or dicarboxylic acid may also be used.

Since the said adjustment of the degree of neutralization by polymer-blending comprises blending copolymers having different degrees of neutralization, it was doubted whether the physical properties of the metal-containing copolymer produced by such a procedure might be comparable to those of the metal-containing copolymer obtained by carefully adjusting the degree of neutralization by acid treatment to a predetermined value. It has been surprisingly confirmed that the metal-containing copolymers obtained by both procedures show substantially the same physical properties.

In carrying out the adjustment of the degree of neutralization by polymer-blending, it is necessary that the secondary copolymer and the copolymer (1) be mixed in the molten state in the ratio calculated from the respective degrees of neutralization. The physical properties of the end product are affected by the type of milling equipment, the milling temperature and the milling time used in the above mixing.

The composition of the metal-containing copolymers obtained by adjusting the degree of neutralization by the aforesaid procedures (III-1) and (III-2) may be expressed in terms of the notations used in the Formula 1 as follows:

$$\frac{b_n+c_n+d_n}{a_n+b_n+c_n+d_n} \times 100 = (01 \text{ to 2preferably 3 to 10})$$

$$\frac{c_n+d_n}{b_n+c_n+d_n} \times 100 = 30 \text{ to } 100 \text{ (preferably 70 to 100)}$$

(degree of saponification)

$$\frac{c_n}{c_n+d_n} \times 100 = 1 \text{ to } 60 \text{ (degree of neutralization)}$$

wherein $n$ is a suffix standing for metal-containing copolymer after adjustment of the degree of neutralization.

(IV) Exchange of metal ion

The metal species in the metal-containing copolymer greatly affects the physical properties (moisture absorption, processability, mechanical properties, etc.) of the copolymer.

In the conventional process, when introducing, for example, zinc, a zinc compound is added to an ethylene-carboxylic acid copolymer and melt-mixed at an elevated temperature while removing byproducts by volatilization, whilst in the process of this invention, the secondary copolymer containing an alkali metal is dispersed in a solution containing water and/or an alcohol, and then to the resulting dispersion is added a compound containing a desired nonalkali metal, whereby the desired nonalkali metal is easily exchanged with the alkali metal on the copolymer to be introduced into the copolymer. This procedure utilizes a difference in affinity of metal ions for the carboxyl anion. The affinity of metal ions for carboxyl anion is in the following order:

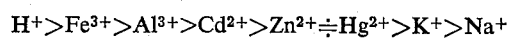

$$H^+ > Fe^{3+} > Al^{3+} > Cd^{2+} > Zn^{2+} \doteqdot Hg^{2+} > K^+ > Na^+$$

In this invention, the ion exchange reaction is mainly carried out at a temperature within the range of from 0° to 150° C., preferably from 20° to 70° C. in a heterogeneous system comprising a metal-containing copolymer in the form of powder or pellets dispersed in a solvent and a desired ionizable metal compound added thereto. The reaction time is 10 to 200 minutes. The solvents to be used in the reaction are chiefly water, lower aliphatic alcohols, or mixtures thereof, said lower aliphatic alcohols including methanol, ethanol, isopropanol, mixed butanol and the like. In addition, in order to facilitate the reaction, solvents having an affinity for the metal-containing copolymer such as, for example, aromatic hydrocarbons, hydroaromatic hydrocarbons, aliphatic hydrocarbons, halogen-substituted aliphatic hydrocarbons, halogenated aromatic compounds, or ketones can be added. It is also possible to carry out the ion exchange reaction in the homogeneous system by properly selecting a combination of the above-said solvents and, in addition, the reaction temperature.

The molar amount of the metal salt to be added is preferably 1 to 10 times the theoretical molar amount necessary for the desired degree of ion exchange of the metal-containing copolymer.

The metal-containing copolymer to be used in the metal ion exchange are the secondary copolymers and metal-containing copolymers obtained therefrom by adjusting the degree of neutralization.

Alternatively, the metal-containing copolymer may be obtained by effecting the metal ion exchange and then adjusting the degree of neutralization.

As metals for use in the metal ion exchange, there are suitable metals of Groups I–B, II–A, II–B and III–A and metals of the fourth period in Group VIII in the Periodic Table of the Elements, such as Cu, Mg, Ca, Ba, Zn, Cd, Al, Fe, Co and Ni.

According to this invention, it is possible to obtain a powder, pellet or shaped article having such a structure that only surface layers have undergone the metal ion exchange reaction while the inner layers have remained substantially unreacted, and contained unexchanged metal ion.

The metal-containing ethylenic copolymer thus obtained can be freely admixed with additives for the purpose of preventing thermal degradation, ultraviolet degradation, blocking, etc.

EXAMPLE 1

(1) Preparation of primary copolymer

Ethylene and methyl methacrylate were copolymerized in an equipment and under reaction conditions common to preparation of high-pressure polyethylene, that is, in the presence of oxygen as a catalyst, at a reaction pressure of 26,000 p.s.i. and a reaction temperature of 240° C. to obtain a primary copolymer containing 17.1% by weight of methyl methacrylate and having a melt index (ASTM D–1238–62 P) of 9.7 g./10 min.

(2) Preparation of secondary copolymer

Run 1: Into 14 kg. of toluene was immersed 5.5 kg. of the aforesaid primary copolymer (in the form of a pellet, 1.8 mm. in diameter and 2.5 mm. in length) to obtain swollen pellets. The swollen pellets were charged into a reactor together with 16.5 kg. of isopropanol and 1.27 kg. of sodium hydroxide and allowed to undergo heterogeneous saponification reaction at a temperature of 83° C. for 7.0 hours, while maintaining the initial form of pellets. The reaction product was washed with 16.5 kg. of water at 20° C. and dried. The secondary copolymer thus obtained was analyzed for the ester group content by infrared spcetroscopy and for the metal content. It was found that the degree of saponification was 94.5 mole percent and the degree of neutralization was 83.5 mole percent.

Run 2: In the same manner as in Run 1, the saponification reaction was conducted for 2.5 hours to obtain a secondary copolymer having a degree of saponification of 83.7 mole percent and a degree of neutralization of 68.2 mole percent.

(3) Evaluation of physical properties

The secondary copolymers obtained in the aforementioned Runs 1 and 2 were evaluated for the melt flow index (at 265° C. under a load of 12.5 kg.), tensile properties (JIS K–6760) and electric characteristics. The results obtained were as shown in Table 1.

TABLE 1

| | Run 1 | Run 2 |
|---|---|---|
| Melt flow index (g./10 min.) | 0.2 | 0.8 |
| Tensile properties (JIS K–6760): | | |
| Yield strength (kg./mm.$^2$) | 0.60 | 1.27 |
| Strength at break (kg./mm.$^2$) | 2.91 | 2.24 |
| Elongation (percent) | 180 | 180 |
| Electric characteristics (ASTM D–257; ASTM D–150): | | |
| Specific resistance (surface resistivity) ($\Omega$) | 2.8×10$^4$ | |
| Volume resistivity ($\Omega$-cm.) | 4.1×10$^{12}$ | |
| Dielectric constant (1 MHz.) | 2.7 | |
| Dielectric loss angle | 194×10$^{-4}$ | |

EXAMPLE 2

A mixture of 100 g. of the primary copolymer obtained in Example 1, 180 g. of benzene, 40 g. of methanol and 6.8 g. of sodium hydroxide was dissolved into a solution at 120° C. and allowed to react for 2 hours in the homogeneous phase. After completion of the reaction, the reaction mixture was cooled to 90° C. when a mixture of 8.3 g. of sulfuric acid and 180 g. of methanol was added to the reaction mixture to adjust the degree of neutralization. The degree of saponification and the degree of neutralization were determined and found to be 93.1 mole percent and 3.5 mole percent, respectively.

The metal-containing copolymer thus obtained was evaluated for physical properties to obtain the results as shown in Table 2.

TABLE 2

| Property | Test method | Unit | |
|---|---|---|---|
| Melt index | ASTM D 1238 | G./10 min. | 1.2 |
| Density | ASTM D 1505 | G./cm.$^3$ | 0.943 |
| Tensile strength | ASTM D 412 | Kg./cm.$^2$ | 251 |
| Elongation | ASTM D 412 | Percent | 480 |
| Low temperature brittleness | ASTM D 746 | −76° C. | 0/10 |
| Vicat softening point | ASTM D 1525 | ° C. | 90 |
| Dissipation factor | ASTM D 150 | 1 MHz. | 0.0046 |
| Dielectric constant | ASTM D 150 | 1 MHz. | 2.20 |
| ESCR | ASTM D 1693[1] | 1 week | 0/15 |

[1] Annealed for 1 hour in 100° C. water and tested in 10% Igepal solution.

EXAMPLE 3

An ethylene-methyl methacrylate copolymer (melt index, 87 g./10 min.; methyl methacrylate content, 14.8% by weight) was obtained as a primary copolymer in a manner similar to that in Example 1.

A mixture of 200 g. of the said primary copolymer, 518 g. of xylene, 471 g. of isopropanol and 40 g. of sodium hydroxide was brought into solution at 84° C. under total reflux and allowed to react in the homogeneous phase. On completion of the reaction, the reaction mixture was cooled to precipitate the reaction prouct, admixed with 396 g. of methanol and then vacuum-filtered. The precipitates collected by filtration were washed with water to obtain a secondary copolymer, on which the degree of saponification and the degree of neutralization were determined and found to be 98.5 mole percent and 83.8 mole percent, respectively.

The metal ion exchange reaction was carried out to replace sodium in the said secondary copolymer by zinc. Each about 16 g. (on dry basis) of the said secondary copolymer was dispersed in 200 g. of water, admixed with varied amounts of zinc acetate, and allowed to undergo the metal ion exchange at 20° C. for 2 hours. The reaction product was separated, washed with water, and dried. The degree of neutralization was determined by measuring the zinc content. In Table 3–1 is shown the relation between the amount of zinc acetate and the degree of neutralization with respect to zinc.

TABLE 3–1

| Run | Amount of Zn(OAc)$_2$ added (g.) | Degree of neutralization (Zn) (mole percent) |
|---|---|---|
| 3 | 0.50 | 28.1 |
| 4 | 1.01 | 46.9 |
| 5 | 1.50 | 65.1 |
| 6 | 2.16 | 69.4 |
| 7 | 4.00 | 75.7 |
| 8 | 8.01 | 83.5 |

On the other hand, the aforesaid secondary copolymer was dispersed in aqueous acetic acid and allowed to undergo demetallization to obtain a metal-containing copolymer (a) having a degree of neutralization of 57.3 mole percent with respect to sodium. A part of the said metal-containing copolymer was further subjected to the demetallization treatment in aqueous hydrochloric acid to obtain a metal-containing copolymer (b) having a degree of neutralization of 32.4 mole percent with respect to sodium. In a similar manner, using aqueous hydrochloric acid of a different concentration, a metal-containing copolymer (c) having a degree of neutralization of 8.7 mole percent with respect to sodium was obtained.

The metal ion exchange reaction was carried out to replace sodium in these metal-containing copolymers (a), (b) and (c) by zinc. Each 32.0 g. of the said metal-containing copolymers was dispersed in a solution of 8.12 g. of zinc acetate in 250 g. of water, and the metal ion exchange reaction was carried out at 20° C. for 2 hours. After separation and water washing, each of the metal-containing copolymers was subjected to determination of the degree of neutralization. The results obtained were as shown in Table 3–2.

TABLE 3-2

| Metal containing copolymer | Degree of neutralization (mole percent) | |
|---|---|---|
| | Na | Zn |
| (A) | 57.3 | 68.0 |
| (B) | 32.4 | 52.9 |
| (C) | 8.7 | 32.3 |

EXAMPLE 4

An ethylene-methyl methacrylate copolymer (melt index, 110 g./10 min.; methyl methacrylate content, 21.6% by weight) was used as the primary copolymer. A mixture of 100 g. of the said copolymer, 360 g. of n-heptane, 40 g. of methanol, 26.5 g. of sodium hydroxide, and 4.0 g. of water was brought into solution at 120° C. and allowed to undergo saponification for 2 hours in the homogeneous phase to obtain a secondary copolymer having a degree of saponification of 100 mole percent and a degree of neutralization of 83.2 mole percent. On the other hand, the ion exchange reaction was carried out, using a part of the said secondary copolymer, under the same conditions as in Run 8 to obtain a copolymer having a degree of neutralization of 82.5 mole percent with respect to zinc. The secondary copolymer and the ion-exchanged copolymer were subjected to the de-metallization reaction in aqueous hydrochloric acid to obtain two metal-containing copolymers (A) and (B) having a degree of neutralization of 43.8 mole percent with respect to sodium and that of 44.0 mole percent with respect to zinc, respectively. The two metal-containing copolymers (A) and (B) were evaluated for moisture absorption.

Preparation of test specimen

Sheets (each measuring 30 x 30 x 1.9 mm.) were molded by means of a compression molding machine under the molding conditions of 180° C., 110 kg./cm.², and 3 minutes.

Drying

The sheets were dried in a vacuum dryer under the conditions of a temperature of 70° C., a pressure of 10 mm. Hg, and a drying time of 150 hours to obtain standard test specimens for evaluating the moisture absorption.

Absorption of moisture

The standard test specimen was allowed to absorb moisture under an atmosphere of a temperature of 40° C. and a relative humidity of 90% while recording weight changes.

Foaming

The specimen which had absorbed moisture was placed on a piece of aluminum foil and kept in an oven at 250° C. for 5 minutes and then inspected for foaming.

The results obtained are summarized in Table 4–1 and Table 4–2.

TABLE 4-1.—MOISTURE ABSORPTION OF (A)

| Time of moisture absorption (hours) | Weight increase (percent) | Foaming |
|---|---|---|
| 1 | 0.173 | Yes. |
| 2 | 0.221 | Yes. |
| 3 | 0.321 | Yes. |
| 7 | 0.501 | Yes. |

TABLE 4-2.—MOISTURE ABSORPTION OF (B)

| Time of moisture absorption (hours) | Weight increase (percent) | Foaming |
|---|---|---|
| 1 | 0.033 | No. |
| 3 | 0.049 | No. |
| 7 | 0.118 | No. |
| 8.5 | 0.145 | Yes. |

Example 5

An ethylene-methyl methacrylate copolymer (melt index, 87 g./10 min.; methyl methacrylate content, 18.2% by weight) was used as the primary copolymer. To the primary copolymer were added 60 g. of sodium hydroxide, 298 g. of isopropanol, and 337 g. of sec-butanol. The resulting mixture was allowed to react in the heterogeneous phase at 89.5° C. (total reflux) to obtain a secondary copolymer having a degree of saponification of 97.1 mole percent.

The said secondary copolymer was dispersed in 500 g. of denatured alcohol. To the resulting dispersion was added 7.5 g., 5.0 g., or 3.0 g. of acetic acid, and allowed to react at 79° C. for 1 hour to obtain a metal-containing copolymer (I) having a degree of neutralization of 56.0 mole percent, a metal-containing copolymer (II) having a degree of neutralization of 38.5 mole percent or a metal-containing copolymer (III) having a degree of neutralization of 20.2 mole percent, respectively. The three metal-containing copolymers thus obtained were evaluated for melt index and tensile properties to obtain the results shown in Table 5.

TABLE 5

| Metal-containing copolymer | Melt index (g./10 min.) | Tensile strength at break (kg./cm.²) | Elongation (percent) |
|---|---|---|---|
| (I) | 0.22 | 369 | 324 |
| (II) | 0.56 | 285 | 358 |
| (III) | 0.76 | 253 | 370 |

EXAMPLE 6

To 1,000 g. of water was added 100 g. of a powdery secondary copolymer (A) (the total content of methacrylic acid and its salt, 4.6 mole percent; degree of neutralization with sodium, 71.2 mole percent $$\frac{c+d}{a+c+d} \times 100 = 4.6, \quad \frac{c}{c+d} \times 100 = 71.2$$

and $b=0$ in terms of the notations used in the Formula 1). The resulting system was found to have a pH of 12.0. A 5% (by weight)-aqueous solution of acetic acid was slowly added to the system until an ultimate pH of 11.13 was reached. The degree of neutralization of the copolymer (I) thus obtained was 45.7 mole percent. The same procedure was repeated, except that the ultimate pH was 10.10, 8.93 or 6.21, respectively. Thus, there was obtained a copolymer (II) having a degree of neutralization of 37.2 mole percent, a copolymer (III) having a degree of neutralization of 25.2 mole percent and a copolymer (IV) having a degree of neutralization of 20.7 mole percent. Physical properties of these four metal-containing ethylenic copolymers were evaluated to obtain the results shown in Table 6–1.

TABLE 6-1

| Ultimate pH in adjusting degree of neutralization | Degree of neutralization (mole percent) | Melt index (g./10 min.) | Haze[1] (percent) |
| --- | --- | --- | --- |
| 11.13 | 45.7 | 0.4 | 7.0 |
| 10.10 | 37.2 | 0.8 | 9.1 |
| 8.93 | 25.2 | 2.4 | 10.4 |
| 6.21 | 20.7 | 3.9 | 13.1 |

[1] ASTM D-1003-6⁰.

On the other hand, the secondary copolymer (A) was allowed to undergo demetallization reaction in aqueous hydrochloric acid to yield a metal-containing copolymer (B) having a degree of neutralization of 4.6 mole percent. The copolymers (A) and (B) were melt-mixed in various ratios by means of a Brabender plastograph at a temperature (temperature of the oil bath) of 180° C., at a revolution speed of 60 r.p.m. for a mixing time of 15 minutes. The mixing ratios and the physical properties of the metal-containing copolymers thus obtained were as shown in Table 6-2.

Figure 2:
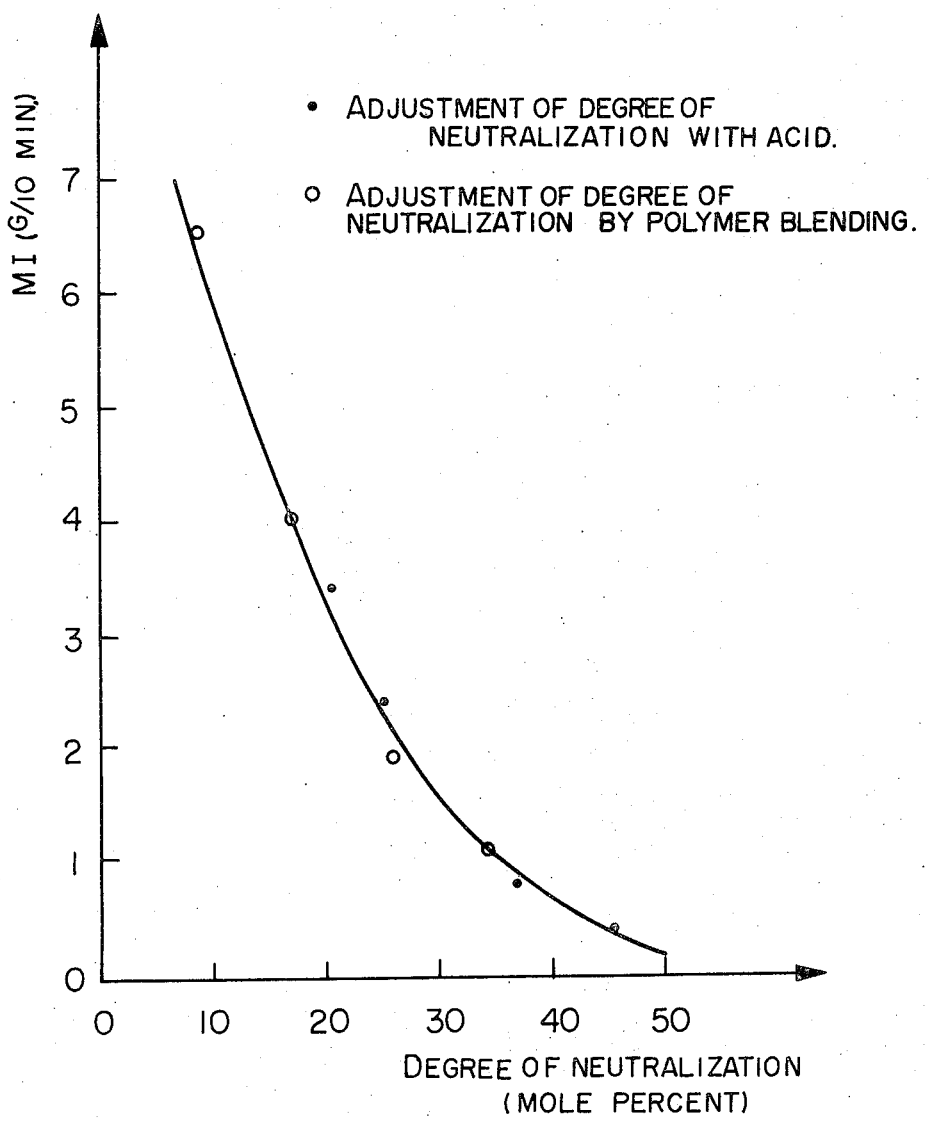
Figure 3:
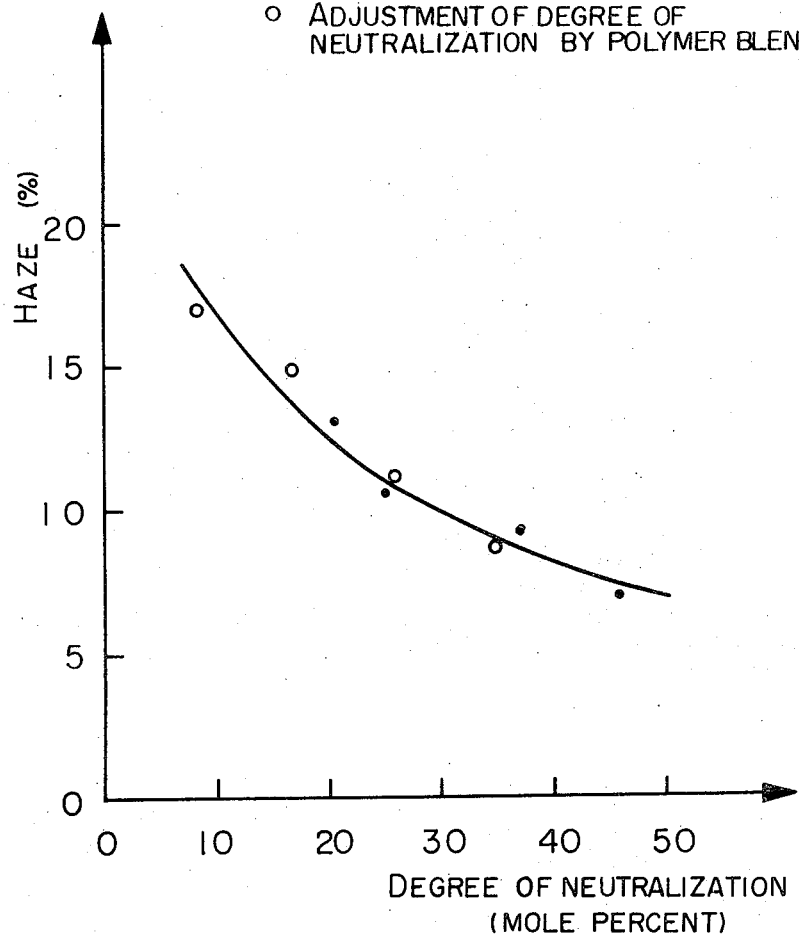

In the accompanying drawings, FIG. 2 shows the relationship between degree of neutralization and melt index and FIG. 3 shows the relationship between degree of neutralization and haze, and both are obtained by plotting the data regarding melt index and haze picked up from Tables 6-1 and 6-2, respectively.

As is apparent from FIGS. 2 and 3, there is substantially no difference between the physical properties of the metal-containing copolymer obtained by adjusting the degree of neutralization with acid and those of the copolymer obtained by adjusting the degree of neutralization by polymer-blending.

TABLE 6-2

| Run | Mixing ratio (g.) A | Mixing ratio (g.) B | Degree of neutralization (mole percent) | Melt index (g. 10 min.) | Haze (percent) | Tensile yield strength (kg./cm.²) | Tensile strength at break (kg./cm.²) | Elongation (percent) | Stiffness[1] (kg./cm.²) |
| --- | --- | --- | --- | --- | --- | --- | --- | --- | --- |
| 9 | 2.4 | 37.6 | 8.6 | 6.5 | 17.1 | 96.3 | 200 | 445 | 1,450 |
| 10 | 7.6 | 32.4 | 17.2 | 4.0 | 14.8 | 114.1 | 213 | 428 | 1,950 |
| 11 | 12.8 | 27.2 | 25.9 | 1.9 | 11.1 | 126.4 | 232 | 409 | 2,380 |
| 12 | 17.3 | 22.7 | 34.5 | 1.1 | 8.7 | 132.3 | 247 | 376 | 2,470 |

[1] ASTM D-747-63.

EXAMPLE 7

An ethylene-methyl methacrylate copolymer (melt index, 10.2 g./10 min.; methyl methacrylate content, 18.4% by weight) obtained by following the procedure in Example 1 was saponified in the same manner as in Example 1 to yield a secondary copolymer having a degree of saponification of 91 mole percent. 5.5 kilograms of the said secondary copolymer was dispersed in a mixed solution comprising 6.85 kg. of toluene, 6.85 kg. of methanol and 0.83 kg. of acetic acid and allowed to react at a temperature of 64° C. for 1 hour to obtain a metal-containing copolymer having a degree of neutralization of 12 mole percent. The said copolymer was again dispersed in a mixed solution of the same composition as mentioned above and allowed to undergo demetallization reaction under the same conditions as mentioned above to obtain a copolymer (I) having a degree of neutralization of 8.6 mole percent. On the other hand, the above-said secondary copolymer was adjusted in the degree of neutralization in the same manner as mentioned before and then allowed to undergo the second adjustment of the degree of neutralization using 1.22 kg. of acetic acid to obtain a copolymer (II) having a degree of neutralization of 3.6 mole percent.

The copolymers (I) and (II) were shaped into a film, 55±5μ in thickness, and adhesion property and modulus of the film were evaluated.

Evaluation of adhesion property

The film was interposed between a sheet of aluminum foil (200μ in thickness, produced by Mitsubishi Aluminum Co.) and a sheet of sheathing polyethylene (DFD-0506, 1.9 mm. in thickness, produced by Nippon Unicar Co.) and bonding was effected at a temperature of 150° C., a pressure of 2.0 kg./cm.², and a bond-forming time of 60 seconds, to produce a laminate. Test specimens, 10 mm. in width, were cut from the laminate and the peel strength was measured under the conditions of a pealing rate of 50 mm./min. and a peeling angle of 180° C.

Evaluation of modulus

According to ASTM D-638, 2%-modulus was measured.

The results obtained were as shown in Table 7.

TABLE 7

| | Adhesion strength (kg./10 mm.)[1] | 2%-modulus (kg./mm.²) |
| --- | --- | --- |
| (I) | 3.00 | 18.9 |
| (II) | 3.84 | 15.0 |
| Referential example | [2] 3.36 | 10.9 |

[1] The minimum tension required within two fixed marks in central part of the test specimen. The mean value on 5 test specimens is given in the table.
[2] A two-ply film (25μ/25μ) of Surlyn A/ethylene-vinyl acetate copolymer was interposed between an aluminum foil and a polyethylene sheathing and evaluated in the same manner as aforementioned.

Example 8

In an ordinary equipment for preparing high-pressure polyethylene and under ordinary conditions for preparing an ethylenic copolymer, ethylene and ethyl acrylate were copolymerized in the presence of oxygen as a catalyst, at a reaction pressure of 37,000 p.s.i. and a reaction temperature of 260° C. to obtain a copolymer having a melt index of 6.0 g./10 min. and containing 19.6% by weight of ethyl acrylate.

To 100 g. of the primary copolymer obtained above were added 20 g. of sodium hydroxide, 235 g. of isopropanol and 240 g. of sec-butanol. The resulting mixture was allowed to undergo heterogeneous reaction at 89.5° C. (under total reflux) to obtain a secondary copolymer having a degree of saponification of 67.7 mole percent.

The said secondary copolymer was impregnated with toluene, then dispersed in a mixed solution comprising 150 g. of isopropanol and 300 g. of acetic acid, and allowed to undergo the reaction for adjustment of the degree of neutralization at 80° C. for 2 hrs. to obtain a copolymer (I) having a degree of neutralization of 5.9 mole percent.

On the other hand, a mixture comprising 20 g. of sodium hydroxide, 235 g. of isopropanol and 300 g. of xylene was added to 100 g. of the aforesaid primary copolymer and allowed to react at 120° C. for 4 hours to obtain a secondary copolymer having a degree of saponification of 100 mole percent. The said secondary copolymer was adjusted in the degree of neutralization by the same procedure as above-mentioned to obtain a copolymer (II) having a degree of neutralization of 1.2 mole percent.

Evaluation of adhesion (A) Adhesion to aluminum foil.—The cut sheets, 1 mm. in thickness, shaped from the aforesaid (I) and (II) were bonded to an aluminum foil (200 μ in thickness, produced by Mitsubishi Aluminum Co.) under the following conditions: temperature 200° C.; pressure 110 kg./cm.²; time 3 minutes.

(B) Adhesion to polyethylene sheating.—The cut sheets shaped from the aforesaid (I) and (II) were bonded to a polyethylene sheating ("DFD–0506," a sheeting, 1 mm. in thickness, produced by Nippon Unicar Co.) under the following conditions: temperature 170° C.; pressure 20 kg./cm.$^2$; time 1 minute.

The laminates thus obtained were evaluated for adhesion strength to obtain the results as shown in Table 8.

TABLE 8.—ADHESION STRENGTH (kg./10 mm.)

| Sample | Substrate | |
|---|---|---|
| | Aluminum foil | Polyethylene sheathing |
| (I) | 4.12 | 2.64 |
| (II) | 5.28 | 3.02 |

What is claimed is:

1. A process for producing a metal-containing copolymer (secondary copolymer) having a degree of saponification of 30 to 100 mole percent and a degree of neutralization of 60 to 100 mole percent, which comprises allowing a copolymer (primary copolymer) of ethylene and at least one monomer selected from the group consisting of esters of $\alpha,\beta$-ethylenically unsaturated monocarboxylic acids having 4 to 10 carbon atoms and diesters of $\alpha,\beta$-ethylenically unsaturated dicarboxylic acids having 4 to 10 carbon atoms, the unsaturated carboxylic ester content of said primary copolymer being 1 to 20 mole percent, to undergo saponification reaction by being reacted with a basic metal compound in a solvent which is a combination of an aliphatic alcohol with at least one of aromatic hydrocarbons, hydroaromatic hydrocarbons, aliphatic hydrocarbons and halogenated aromatic compounds.

2. A process according to claim 1, wherein the unsaturated monocarboxylic ester is an ester of methacrylic acid with a lower aliphatic alcohol.

3. A process according to claim 2, wherein the ester of methacrylic acid with a lower aliphatic alcohol is methyl methacrylate.

4. A process according to claim 1, wherein the unsaturated monocarboxylic ester is an ester of acrylic acid with a lower aliphatic alcohol.

5. A process according to claim 4, wherein the ester of acrylic acid with a lower aliphatic alcohol is ethyl acrylate.

6. A process according to claim 1, wherein the basic metal compound is a basic alkali metal compound.

7. A process according to claim 6, wherein the basic alkali metal compound is sodium hydroxide.

8. A process according to claim 1, wherein the saponification reaction is carried out in the homogeneous system comprising the primary copolymer dissolved in the solvent.

9. A process according to claim 8, wherein the solvent is a combination of isopropanol with xylene.

10. A process according to claim 8, wherein the solvent is a combination of methanol with n-heptane.

11. A process according to claim 8, wherein the solvent is a combination of methanol with benzene.

12. A process according to claim 1, wherein the saponification reaction is carried out in a heterogenous system comprising a solvent and a pellet, film or bottle of the primary copolymer while maintaining the shape of those articles unchanged.

13. A process according to claim 12, wherein the pellet, film or bottle of a primary copolymer is previously impregnated with at least one member selected from the group consisting of aromatic hydrocarbons, hydroaromatic hydrocarbons, aliphatic hydrocarbons, and halogenated aromatic compounds.

14. A process for producing a metal-containing copolymer (I) having a desired degree of neutralization, which comprises adding at least one acid selected from the group consisting of inorganic acids and organic acids to the secondary copolymer obtained by the process according to claim 1 to convert a part of the metal carboxylate groups in said copolymer into carboxyl groups, wherein the secondary copolymer is dispersed in at least one solvent selected from the group consisting of water and alcohols.

15. A process according to claim 14, wherein the secondary copolymer is previously impregnated with at least one member selected from the group consisting of aromatic hydrocarbons, hydroaromatic hydrocarbons, aliphatic hydrocarbons, halogenated aromatic compounds, and halogen-substituted aliphatic hydrocarbons.

16. A process for producing a metal-containing copolymer (2) having a desired degree of neutralization, which comprises melt-mixing the secondary copolymer obtained by the process of claim 1 with a stoichiometric amount of a copolymer (1) which has the Formula 1

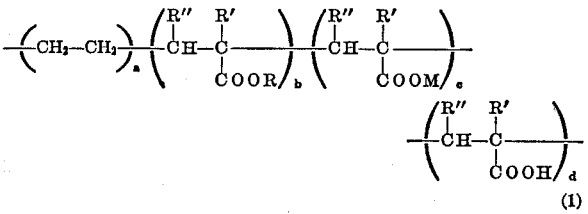

(1)

wherein, R is a lower alkyl group, M is a metal, R' and R" are hydrogen or a lower alkyl group; either R' or R" in unit (B) may be COOR, either R' or R" in units (C) and (D) may be COOR, COOM or COOH; and $a$, $b$, $c$ and $d$ represent the number of moles of the respective units, and which has the composition satisfying the following conditions:

$$\frac{b+c+d}{a+b+c+d} \times 100 = 1 \text{ to } 20$$

$$\frac{c+d}{b+c+d} \times 100 = 30 \text{ to } 100$$

Degree of neutralization $= \frac{c}{c+d} \times 100 = 0 \text{ to } 20$

17. A process according to claim 16, wherein the copolymer (1) is the metal-containing copolymer (I) obtained by the process of claim 14.

18. A process for producing a metal-containing copolymer (I) containing a nonalkali metal, which comprises reacting at least one of the ionizable nonalkali metal compounds with the secondary copolymer obtained by the process of claim 6.

19. A process for producing a metal-containing copolymer (II) containing a nonalkali metal, which comprises reacting at least one of the ionizable nonalkali metal compounds with the alkali metal-containing copolymer obtained in claim 14.

20. A process for producing a metal-containing copolymer (I) having a desired degree of neutralization, which comprises adding at least one acid selected from the group consisting of inorganic acids and organic acids to the metal-containing copolymer (I) obtained by the process of claim 18 to convert a part of the metal carboxylate groups in said copolymer into carboxyl groups.

21. A process according to claim 18, wherein the non-alkali metal is at least one metal selected from the group consisting of metals of Groups I-B, II-A, II-B and III-A and metals of the fourth period of Group VIII in the Periodic Table of the Elements.

22. A process according to claim 19, wherein the non-alkali metal is at least one metal selected from the group consisting of metals of Groups I-B, II-A, II-B and III-A and metals of the fourth period of Group VIII in the Periodic Table of the Elements.

23. A process of claim 1, wherein the solvent is a mixture of an aliphatic alcohol and an aromatic hydrocarbon.

References Cited
UNITED STATES PATENTS

| | | | |
|---|---|---|---|
| 3,519,589 | 7/1970 | Lyons | 260—29.6 |
| 3,029,228 | 4/1962 | Glavis | 260—86.1 |
| 3,180,844 | 4/1965 | Dickerson | 260—30.6 |
| 3,009,895 | 11/1961 | Slocombe | 260—32.8 |
| 3,536,682 | 10/1970 | Brown et al. | 260—86.7 |
| 3,679,561 | 7/1972 | Galiano et al. | 204—159.15 |
| 3,649,578 | 3/1972 | Bush et al. | 260—23 AR |

JOSEPH L. SCHOFER, Primary Examiner

J. KIGHT III, Assistant Examiner

U.S. Cl. X.R.

260—78.5 HC, 80.71, 86.1 R, 86.7; 264—340